United States Patent [19]

Fujisou et al.

[11] Patent Number: 5,130,115
[45] Date of Patent: * Jul. 14, 1992

[54] PROCESS FOR HYDROGEN PRODUCTION FROM KEROSENE

[75] Inventors: Tokuo Fujisou, Yokosuka; Shigeyuki Hayashi, Yokohama; Soichi Nomura, Tokyo; Akira Obuchi; Hideharu Kato, both of Yokohama, all of Japan

[73] Assignees: Nippon Oil Co., Ltd.; Petroleum Energy Center, both of Japan

[*] Notice: The portion of the term of this patent subsequent to Jun. 25, 2008 has been disclaimed.

[21] Appl. No.: 300,414

[22] Filed: Jan. 23, 1989

[30] Foreign Application Priority Data

Jan. 22, 1988 [JP] Japan ................................. 63-12243
Jan. 22, 1988 [JP] Japan ................................. 63-12244

[51] Int. Cl.$^5$ .............................................. C01B 3/26
[52] U.S. Cl. ........................... 423/652; 423/653; 423/654
[58] Field of Search ................... 423/653, 652, 654

[56] References Cited

U.S. PATENT DOCUMENTS 3,737,291  6/1973  Lhonore et al. ................... 423/653

FOREIGN PATENT DOCUMENTS 2141875  3/1973  Fed. Rep. of Germany ...... 423/653
35403    2/1988  Japan ................................... 423/653

Primary Examiner—Wayne Langel
Attorney, Agent, or Firm—Bruce L. Adams; Van C. Wilks

[57] ABSTRACT

A process is disclosed for producing hydrogen of high purity from kerosene in petroleum oil. A feed of kerosene containing up to 1,000 wt.ppm of sulfur compounds is brought into contact with a nickel-containing sorbent at below 50 kg/cm$^2$.G and at 150°–350° C. The resulting kerosene feed is further treated with a reforming catalyst under standard steam reforming conditions.

3 Claims, 2 Drawing Sheets

PROCESS FOR HYDROGEN PRODUCTION FROM KEROSENE

BACKGROUND OF THE INVENTION

1. Field of the Invention

This invention relates to the production of hydrogen by reforming a petroleum oil fraction. More specifically, the invention is directed to a process of deriving hydrogen from a kerosene fraction in which kerosene is stripped of its sulfur contents by means of a hydrogenative desulfurization catalyst, a hydrogen sulfide absorbent and a nickel sorbent and subjected, with addition of water, to reforming reaction on a steam reforming catalyst.

2. Prior Art

Generally, hydrogen finds wide application for instance as a starting material, a fuel, a refining agent and the like and is made available by a variety of processes including electrolysis of water and steam reforming, partial oxidation, decomposition or desulfurization of hydrocarbons and alcohols. Hydrogen derived from electrolysis of water is highly pure, though costly, and hence finds special application as in physic-chemical experiments. Hydrogen for industrial usage such as for starting materials or product refining is in most cases produced by steam reforming or partial oxidation of relatively inexpensive, readily available materials, in which instance steam reforming of light hydrocarbons or alcohols is more often witnessed than partial oxidation of coals or heavy residual oils. Examples of such light hydrocarbons and alcohols include methane, ethane, propane and butane either singly or in combination, and gases containing these hydrocarbons, light naphtha, heavy naphtha and methanol.

Whereas, despite its ease of handling, storage and transport and its low cost, kerosene has not thus far found much use as a source for hydrogen. The main obstacle to this is that it has been economically infeasible to remove sulfur contents from kerosene to a level of concentration (not exceeding 0.2 ppm) tolerable to reforming catalysts which are highly sensitive to sulfur compounds.

A hydrogenative desulfurization process is known for removing sulfur compounds from petroleum oils in the presence of a hydrogen-containing gas by the use of a catalyst such as a cobalt-molybdenum, nickel-molybdenum and nickel-tungsten at elevated temperature and pressure conditions. With this process to reduce sulfur contents to less than 0.2 ppm, it would require pressures above 100 kg/cm$^2$.G and a liquid per hour space velocity (LHSV) of below 0.1 h$^{-1}$ over extended length of time.

It has also been proposed to adsorb sulfur compounds onto metal oxides such as zinc oxide, copper oxide, manganese oxide and iron oxide, but such adsorption method has been experimentally proven hardly possible to maintain a sulfur level below 0.2 ppm.

Reforming processes are employed for removing sulfur contents from a naphtha fraction by adsorption with use of Ni-containing sorbent, but such processes have not thus far been applied to kerosene. The present inventors disclosed a similar adsorption method in Japanese Patent Application No. 61-175322, which method was later found not quite satisfactory because considerable quantities of Ni-containing sorbent are required to achieve the 0.2 ppm level over prolonged length of time.

SUMMARY OF THE INVENTION

With the foregoing drawbacks of the prior art processes in view, the present invention has for its primary object to provide a novel process of producing hydrogen of high purity from a kerosene fraction in petroleum oil.

A more specific object of the invention resides in the provision of a process for hydrogen production in which sulfur compounds in the starting kerosene material are reduced to a level of concentration tolerable to a reforming catalyst and thereafter the kerosene material is subjected to steam reforming treatment.

The above and other objects and features of the invention will appear apparent from the following detailed description taken in conjunction with certain specific examples and the accompanying drawings.

According to one aspect of the invention, there is provided a process for the production of hydrogen which comprises contacting a feed of kerosene containing up to 1,000 wt.ppm of sulfur compounds with a nickel-containing sorbent at a pressure of below 50 kg/cm$^2$.G and a temperature of 150°-350° C. and further with a reforming catalyst in the presence of steam under standard steam reforming conditions.

The inventive process more specifically comprises contacting a feed of kerosene containing up to 1,000 wt.ppm of sulfur compounds with a hydrogenative desulfurization catalyst and a hydrogen sulfide absorbent in the presence of a hydrogen-containing gas at a pressure of below 50 kg/cm$^2$.G, a temperature of 270°-400° C., a LHSV of 0.2-7 h$^{-1}$ and a hydrogen-kerosene ratio of 0.02-1.0 Nm$^3$H$_2$/kg kerosene, further contacting said feed with a nickel-containing sorbent at a pressure of below 50 kg/cm$^2$.G, a temperature of 150°-350° C., and a LHSV of 0.1-10 h$^{-1}$ and still further contacting the resulting feed with a reforming catalyst in the presence of steam under standard steam reforming conditions.

According to another aspect of the invention, there is provided a process for the production of hydrogen suitable for use in dispersion-type fuel batteries which comprises reacting a feed of kerosene containing up to 1,000 wt.ppm of sulfur compounds with a nickel-containing sorbent comprising more than 40 wt.% of nickel deposited on a support having a surface area of larger than 50 m$^2$/g in the absence of hydrogen or in the presence of less than 0.2 mol of hydrogen at a pressure of atmospheric - 10 kg/cm$^2$.G and a temperature of 250°-300° C. thereby reducing the sulfur content in the feed to below 0.5 wt.ppm, adding a predetermined amount of water to the resulting fluid, and treating the same with a reforming catalyst comprising more than 5 wt. % under standard steam reforming conditions.

DETAILED DESCRIPTION

Figure 1:
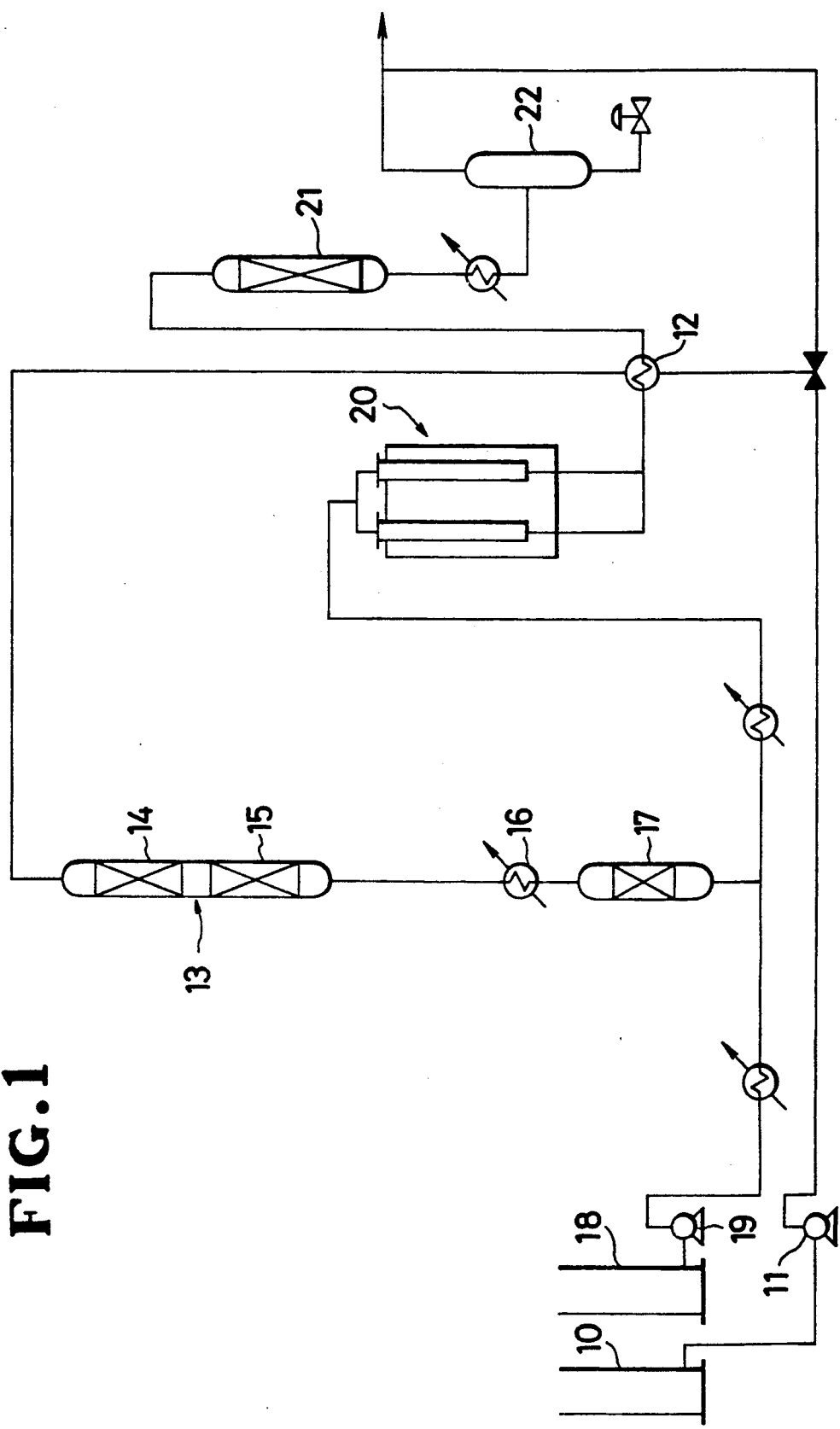
FIG. 1 is a process flow diagram representing one mode of hydrogen refining process according to the invention.

Kerosene used as a starting material in accordance with the invention desirously may have a sulfur content of up to 1,000 wt.ppm, a flash point of above 40° C. and a 95% distillate temperature of below 270° C. and this class of kerosene is commercially readily available.

Kerosene is at first contacted with a hydrogenative desulfurization catalyst of an active metal such as cobalt-molybdenum, nickel-cobalt-molybdenum and nickel-tungsten deposited on an alumina or an oxide carrier predominantly of alumina. Cobalt or nickel may be deposited as an oxide in an amount of 2-7 wt. %. Molybdenum or tungsten may be deposited as an oxide in an amount of 8-25 wt. %. The catalyst may be about 0.7-5 mm in diameter and 10 mm long. It may be extruded or stamped into a diametric cross-sectional shape which is preferably circular, trefoiled and quotrefoiled. This desulfurization catalyst is reduced by hydrogen gas and pre-sulfurized by a sulfurizing agent either before or after it is packed in a desulfurization reactor. After this pre-treatment, the reactor is supplied with kerosene and hydrogen-containing gas under specified conditions. Hydrogen-containing gas may be supplied from an external source, but may be more conveniently a portion of hydrogen which is produced according to the invention and which may be recycled.

A reformed gas from a steam reformer comprises $H_2$, $CO_2$, CO, $H_2O$, $CH_4$ and traces of $Ca^{2+}$ normally in thermodynamic equilibrium and is used as it is or after removal of materials other than hydrogen depending upon how hydrogen is eventually used. Hydrogen-containing gas to be recycled may therefore contain substantially 30% or more of hydrogen.

Kerosene and hydrogen-containing gas may be passed upwardly or downwardly through the desulfurization reactor which is operated at a pressure of 50 kg/cm$^2$.G or desirably at lower pressures, say about 10 kg/cm$^2$.G or below. Reaction temperature may be in the range of 250°-400° C. LHSV may be in the range of 0.2-7 h$^{-1}$. Hydrogen/kerosene ratio is preferably 0.02-1.0 Nm$^3$ (pure hydrogen)/kg kerosene.

Hydrogen sulfide resulting from the desulfurization reaction should be removed with use of a suitable absorbent. This absorbent may be basic, including caustic soda, caustic potash, magnesium hydroxide, calcium hydroxide, monoethanolamine, diethanolamine, isopropylamine, ZnO, CuO, $Fe_2O_3$-$Cr_2O_3$, ZnO-CuO, ZnO-$MoO_3$ and ZnO-$Fe_2O_3$, of which solid compounds such as ZnO is preferred for ease of handling and reasons of economy particularly where sulfur contents in kerosene are held below 1,000 ppm as contemplated in the invention. The hydrogen sulfide absorbent may be packed separatedly from the desulfurization catalyst and should be subjected to the same reaction conditions as desulfurization, or may be placed in the same reactor immediately after the catalyst is introduced.

Kerosene upon treatment with the absorbent is then contacted with Ni-containing sorbent, in which instance care should be taken in view of $CO_2$ and CO concentrations in the hydrogen-containing gas. If the sum of $CO_2$ and CO is below 2 vol. %, kerosene and hydrogen-containing gas may be contacted, as they are, with the Ni sorbent. When the sum of $CO_2$ and CO exceeds 2 vol. %, kerosene and hydrogen-containing gas should be separated so that liquid-phase kerosene alone may be contacted with the Ni sorbent and thereafter merged with the gas phase. This is because CO in excess of 2 vol. % tends to react with $H_2$ on the Ni sorbent and transform into methane, leading to hazardous temperature rise. The same can be said of $CO_2$.

The Ni sorbent used in the invention preferably contains Ni in an amount of 40-70 wt. % and may further contain small quantities of copper, chrome, zirconium, magnesium and other metal components. The catalyst carrier or support may be silica, alumina, silica-alumina, titania, zirconia, zinc oxide, clays, diatomaceous earth and other fire-proof inorganic oxides. The Ni sorbent may be stamped, extruded or spherical and its size is preferably 0.7-5 mm. It may be, if necessary, surface-treated to avoid fire hazard, and may be, prior to use, hydrogen-reduced at 150°-400° C. or stripped of carbon oxide gas adsorbed by an inert gas.

Kerosene, regardless of whether it is entrained with hydrogen-containing gas, should be contacted with the Ni-containing sorbent under a set of conditions, a pressure of below 50 kg/cm$^2$.G, a temperature of 150°-350° C. and LHSV of 0.1-10 h$^{-1}$, whereby there may be obtained a grade of kerosene whose sulfur content is reduced below 0.2 wt. % suitable for subsequent steam reforming. The thus obtained kerosene together with hydrogen-containing gas is added with steam and contacted with a reforming catalyst in the reforming unit.

The reforming catalyst contains, as an active metal, nickel in an amount of 5-50 wt. %, preferably 10-35 wt. % and may also contain ruthenium. As a carrier for this catalyst, there may be used preferably alumina, but there may be also used magnesia, silica, calcia, and magnesia-alumina spinel either alone or in combination. There may be used an assisting catalyst such as of an oxide of an alkali metal, an alkali earth metal and a rare earth metal which may be added in an amount of less than 10% to prevent carbon precipitation. For reforming hydrocarbons of higher carbon number such as kerosene, there should be used a catalyst containing an assisting catalyst in a first catalyst bed, while a second catalyst bed is preferably packed with a catalyst free of assisting catalysts.

Kerosene reforming reaction is preferably carried out at 400°-600° C. at catalyst bed inlet, at 600°-900° C. at catalyst bed outlet, at a pressure of 1-30 kg/cm$^2$.G, at a steam/carbon molar ratio of 3.5-6.5, at a hydrogen-kerosene ratio of 0.05-0.7 Nm$^3$/kg, and at LHSV of 0.2-4. Reformed gas predominantly of hydrogen contains $CO_2$, CO $CH_4$ and $H_2O$ and may be further refined if necessary. CO may be removed or reduced by contacting the reformed gas with a high temperature modifying catalyst such as of $Fe_2O_3$—$Cr_2O$ at 300°-500° C. and/or a low temperature modifying catalyst at 150°-250° C. Where it is required to reduce CO to less than 0.1 vol. %, it may be further treated by Ni catalyst packed methanator. If $CO_2$ is to be removed, this can be done by using a basic material such as KOH. Hydrogen-containing gas after being refined may be put to use as it is, or may in part be recycled to the desulfurization reactor.

The invention will be further described with reference to the accompanying drawings.

FIG. 1 is a process flow diagram for hydrogen production application where the sum of $CO_2$ and CO concentrations in hydrogen-containing gas is less than 2 vol. %.

Kerosene feed from a feed tank 10 is passed through a pump 11 where it is pressurized to a predetermined reaction pressure and admixed with entrained hydrogen-containing gas and transferred to a heat exchanger 12 wherein the admixture is heated through heat exchange with a flow of reformed product. The feed is then introduced into a hydrogenative desulfurization reactor 13 where it is first passed through a hydrogen refining catalyst bed 14 and 50 kg/cm$^2$.G, at 250°-400°

C. and at LHSV of 0.5-7, whereupon the majority of sulfur compounds in the kerosene feed is hydrogenated and transformed into a light compound predominantly of hydrogen sulfide. The majority of sulfur compounds are removed by absorption upon passage through a desulfurization catalyst bed 15 packed with zinc oxide located downstream of the bed 14 in the same reactor. Kerosene and hydrogen-containing gas are then maintained at 180°-300° C. upon possasage through a heat exchanger (16) and contacted with a Ni-containing catalyst in a desulfurization reactor 17 to remove residual sulfur compounds thereby producing treated kerosene having a sulfur content of less than 0.2 wt.ppm. The thus treated kerosene stream is added with a predetermined amount of water (steam) supplied from a water tank 18 via pump 19 and introduced into a reforming reactor 20 wherein it is contacted with a steam reforming catalyst and gasified. Reformed gas is cooled though the heat exchanger 12, and passed into a reactor 21 packed with a shift reaction catalyst where its carbon monoxide content is reduced to provide increased hydrogen contents and then the stream is cooled and condense-separated at a knock-out drum 22.

Figure 2:
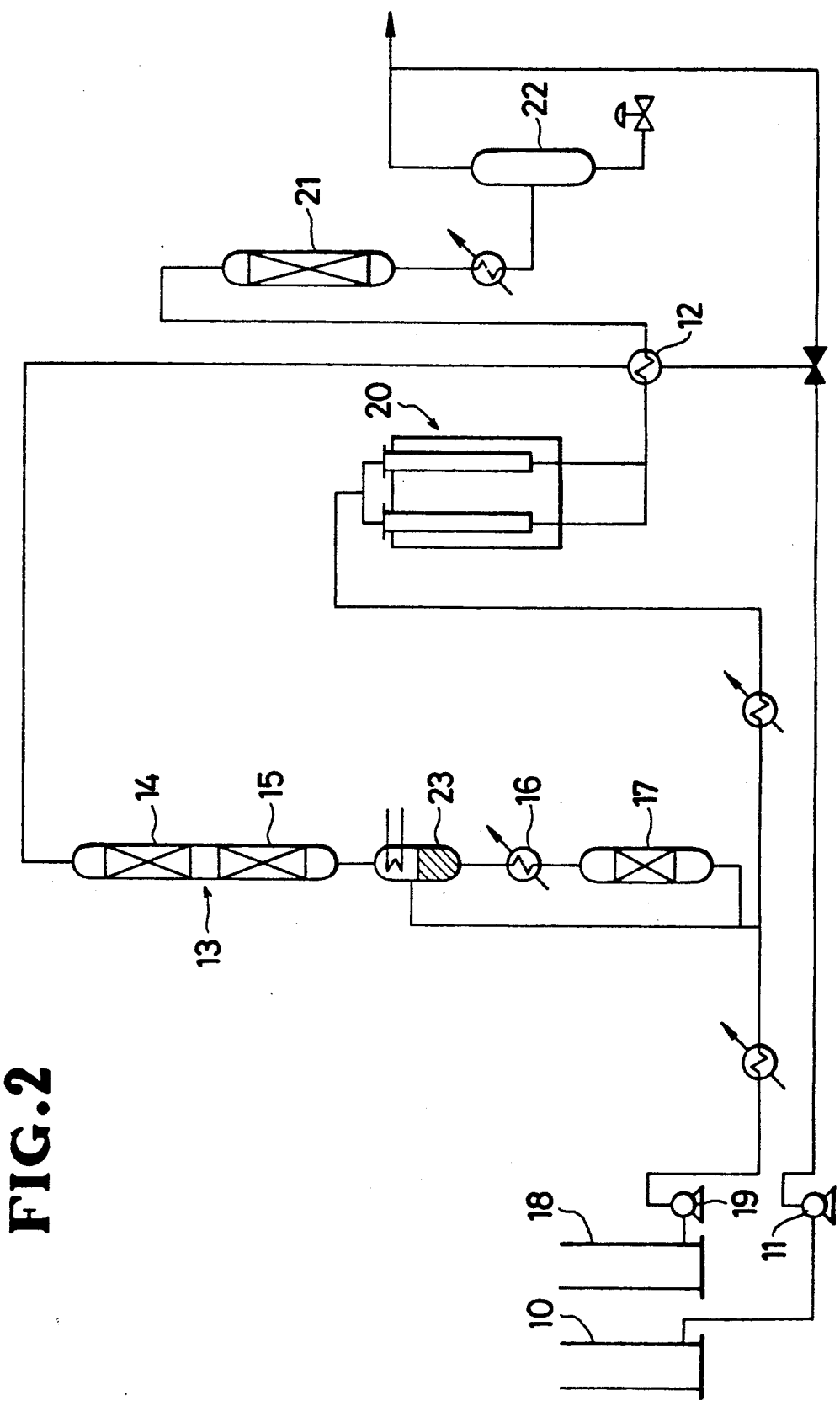
FIG. 2 is a similar diagram but representing another mode of the inventive process.

FIG. 2 shows a similar process flow diagram but this is applicable where the sum of $CO_2$ and CO concentrations in hydrogen-containing gas is more than 2 vol. %.

Kerosene feed from a feed tank 10 is passed through a pump 11 where it is pressurized to a predetermined reaction pressure and admixed with entrained hydrogen-containing gas and transferred to a heat exchanger 12 wherein the admixture is heated through heat exchange with a flow of reformed product. The feed is then introduced into a hydrogenative desulfurization reactor 13 where it is first passed through a hydrogen refining catalyst bed 14 and 50 kg/cm$^2$.G, at 250°–400° C. and at LHSV of 0.5-7, whereupon the majority of sulfur compounds in the kerosene feed is hydrogenated and transformed into a light compound predominantly of hydrogen sulfide. The majority of sulfur compounds are removed by absorption upon passage through a desulfurization catalyst bed 15 packed with zinc oxide located downstream of the bed 14 in the same reactor. Treated kerosene stream from the desulfurization catalyst bed 15 is cooled upon passage through a gas-liquid separator 23 and separated between gas and liquid phases and further heated at 180°-300° C. through the heat exchanger 16 so that the liquid fraction alone is contacted with the nickel-containing catalyst in the desulfurization reactor to reduce its sulfur content to less than 0.2 ppm. Kerosene stream of less than 0.2 ppm sulfur is mixed with hydrogen-containing gas from the separator 23 and added with water (steam) from the water tank 18 and thereafter introduced into the reforming reactor 20 where it is decomposed and gasified. Reformed gas is cooled through the heat exchanger 12 and passed through the reactor 21 and finally into the knock-out drum 22 in a manner described in connection with FIG. 1.

INVENTIVE EXAMPLE 1

The process shown in FIG. 1 was followed in implementing the invention. There was used a commercially available kerosene which had a sulfur content of 26 wt.ppm, a specific gravity of 0.796 (15/4° C.), a boiling point of 164°-262° C., an aromatics content of 17.0 vol. %, and a smoke point of 28 mm. This kerosene feed was subjected to hydrogenation in the hydrogenative refining reactor packed initially with 40 ml of cobalt (2.5 wt. % CoO)-molybdenum (12.5 wt. % $MoO_3$)-alumina hydrogenative desulfurization catalyst and then with 40 ml of ZnO as hydrogen sulfide absorbent, in which the reaction was effected at a pressure of 10 kg/cm$^2$.G, at a temperature of 380° C., at LHSV of 5 and at a hydrogen/kerosene ratio of 0.5 Nm$^3$H$_2$/kg (above 95 vol. % H$_2$ and below 2 vol. % $CO_2$+CO). Treated kerosene having about 2-3 ppm of residual sulfur was cooled to 280° C. and further treated in the sorbent reactor packed with a sulfur sorbent of nickel-diatomaceous earth metal catalyst (65 wt. % nickel) at a pressure of 9 kg/cm$^2$.G, a temperature of 200° C. and LHSV of 1. The reactor was constructed with a stainless tube about 20 mm in diameter packed with 200 ml of sorbent. Sulfur contents in treated kerosene was reduced to below 0.2 wt.ppm. This refined kerosene was further treated in the reforming reactor packed with a steam reforming catalyst comprising 34 wt. % of NiO, 12 wt. % of $Al_2O_3$ and 25 wt. % of MgO under reaction conditions of 9 kg/cm$^2$.G pressure, 500° C. inlet temperature, 850° C. outlet temperature, a hydrogen/kerosene ratio of 0.5 Nm$^3$H$_2$/kg and LHSV of 1.5 and H$_2$O/C. of 3.5 mol/mol. Even after a lapse of 5,000 hours following the initiation of the reaction, the reactor tube showed no appreciable change in temperature distribution and the outlet gas composition was nearly in thermodynamic equilibrium. The indication was that even kerosene if reduced in its sulfur content to below 0.2 wt.ppm can be well reformed with steam into acceptable grade of hydrogen.

INVENTIVE EXAMPLE 2

Kerosene having a sulfur content of 38 wt.ppm was treated by apparatus shown in FIG. 1. Kerosene feed was introduced into the reactor packed with nickel-molybdenum catalyst and hydrogen-sulfide absorbent and treated under a set of reaction conditions:- pressure 9 kg/cm$^2$.G; temperature 380° C; LHSV 0.5; and hydrogen/kerosene 0.06 Nm$^3$H$_2$/kg (H2 74 vol. % and CO+CO$_2$ 25.3 vol. %). Treated kerosene having about 3-6 ppm of residual sulfur was cooled and gas-liquid separated, and further treated in the sulfur sorbent reactor packed with nickel-diatomaceous earth metal catalyst containing 65 wt. % of nickel at a pressure of 8.5 kg/cm$^2$.G, a temperature of 280° C. and LHSV of 0.5. The resulting sulfur content was less than 0.2 wt.ppm. The feed was mingled with previously separated gaseous components and transferred to the reforming reactor packed with a steam reforming catalyst comprising 22 wt. % of NiO, 26 wt. % of $Al_2O_3$, 11 wt. % of MgO, 13 wt. % of CaO, 16 wt. % of SiO and 7 wt. % of $K_2O$. Reforming conditions were the same as in Inventive Example 1. Even after 5000 hours following the initiation of the reaction, the reactor tube showed no appreciable change in temperature distribution with its peak only slightly shifted toward the tube outlet and with the outlet gas composition approximating a thermodynamic equilibrium.

COMPARATIVE EXAMPLE 1

Kerosene feed used in Inventive Example 2 was introduced into the reactor packed with commercially available cobalt (CoO 2.5 wt. %)-molybdenum (MoO3 12.5 wt. %)-alumina catalyst and a hydrogen sulfide absorbent of ZnO and treated at a pressure of 20 kg/cm2.G, a temperature of 380° C., LHSV of 0.5 and hydrogen/kerosene of 0.3 mol/mol (H$_2$ 74 vol. % and CO+CO$_2$ 25.3 vol. %). The reaction product was immediately taken into the reforming reactor and sampled for sulfur content measurement. Sulfur in kerosene was 0.02 wt.ppm as measured up until a period of 1,000 hours from the start, but gradually increased with time and reached 1 wt.ppm after a lapse of 2,000 hours, indicating an extremely shortened length of time for possible treatment. Hydrogenated feed was finally subjected to reforming reaction under the same conditions as used in Inventive Example 1. It was observed that hydrogen gas had been available quite satisfactorily over initial periods of reaction, but after a lapse of 200 hours the heat absorbing zone of the reactor tube gradually transferred toward its outlet with the temperature peak accordingly shifted downwardly, and finally after 500 hours there were detected unreacted hydrocarbons in the outlet gas. This indicates that the nickel type steam reforming catalyst is apt to become deteriorated considerably with sulfur contents exceeding 0.5 wt.ppm.

COMPARATIVE EXAMPLE 2

Kerosene feed having a sulfur content of 63 wt.ppm was introduced into the reactor packed with a sorbent similar to the one used in Inventive Example 1 containing 65 wt/% of nickel and treated at a pressure of 10 kg/cm$^2$.G, a temperature of 270° C. and LHSV of 0.5. Sulfur in kerosene was 0.04 wt.ppm as measured up until a period of 1,000 hours from the start, but gradually increased with time and reached over 1 wt.ppm after a lapse of 2,000 hours, indicating an extremely shortened length of time for possible treatment. Hydrogenated feed was finally subjected to reforming reaction under the same conditions as used in Inventive Example 1. It was observed that hydrogen gas stream had been available quite satisfactorily over initial periods of reaction, but after a lapse of 120 hours the heat absorbing zone of the reactor tube gradually transferred toward its outlet with the temperature peak accordingly shifted downwardly, and finally after 310 hours there were detected unreacted hydrocarbons in the outlet gas. This indicates that the nickel type steam reforming catalyst is apt to become deteriorated considerably with sulfur contents exceeding 0.5 wt.ppm.

COMPARATIVE EXAMPLE 3

Commercially available kerosene was used which had a sulfur content of 62 wt.ppm, a specific gravity of 0.799 (15/4° C.), a boiling point of 165°-269° C., an aromatics content of 25.3 vol. % and a smoke point of 23 mm. Kerosene feed was treated at a pressure of 9 kg/cm$^2$.G, a temperature of 275° C. and an LHSV of 0.2 in a hydrogenative refining reactor. The reactor was of a stainless tube having a diameter of 20 mm and packed with 40 cm$^3$ of absorbent containing 65 wt. % of nickel. Sulfur in treated kerosene was negligibly small as measured up until a period of 5,000 hours from the start, but gradually increased with time and reached over 0.2 wt.ppm after a lapse of about 5,500 hours.

Kerosene thus refined was further treated in a steam reforming reactor with a steam reforming catalyst comprising 34 wt. % of NiO, 12 wt. % of Al$_2$O$_3$ and 54 wt. % of MgO under the same conditions as was in Inventive Example 1. Even 5,000 hours afterwards following the initiation of reaction, the reactor tube was observed to involve no substantial change in temperature distribution with the outlet gas composition held thermodynamically equilibrious. This indication was that kerosene if reduced in its sulfur content to 0.5 wt.ppm or smaller could be steam-reformed to produce hydrogen of accepted quality.

COMPARATIVE EXAMPLE 4

A kerosene fraction was collected by atmospheric distillation of crude oil of Arabic origin and then added with 10% of coker kerosene. The resulting kerosene feed was treated in a hydrogenative refining reactor filled with the same catalyst as used in Inventive Example 1. The reaction was effected at a pressure of 50 kg/cm$^2$.G, a temperature of 320° C., an LHSV of 2 and a hydrogen/kerosene ratio of 300 N liter/liter, thereby obtaining refined kerosene having a sulfur content of 38 wt.ppm, a specific gravity of 0.788, a boiling point of 160°-260° C, an aromatics content of 18 vol. % and a smoke point of 25 mm.

Refined kerosene was subsequently treated in a sorbent reactor packed in an air-tight fashion with sulfur sorbent containing 47% of nickel and marketed for use in naphtha. Reaction conditions were at a pressure of 7 kg/cm$^2$.G, a temperature of 290° C., an LHSV of 0.2 and a hydrogen/kerosene ratio of 0.2 mol/mol. Sulfur content in kerosene was less than 0.1 wt.ppm until a lapse of 8,500 hours from the start, but gradually increased with time and reached 0.5 wt.ppm after about 12,000 hours.

Kerosene so treated was subjected to steam reforming under the same conditions as was in Inventive Example 3. The steam reforming catalyst used was composed of 22 wt. % of NiO, 26 wt. % of Al$_2$O$_3$ and 11 wt. % of MgO. Even after 5,000 hours following the initiation of reaction, the reactor tube showed no appreciable change in temperature distribution with the peak temperature only slightly shifted toward the outlet tube and with the outlet gas composition held in thermodynamic equilibrium.

COMPARATIVE EXAMPLE 3

Kerosene feed used in Inventive Example 3 was taken into the reactor packed with commercially available nickel-diatomaceous earth metal catalyst containing 3.5 wt. % of nickel. Sulfur in kerosene was more than 0.5 wt.ppm immediately after the start, indicating that this catalyst failed to produce kerosene of reduced sulfur. Reaction was continued for a shorter period of time to give kerosene having an average sulfur content of 10 wt.ppm.

Kerosene feed of 10 wt.ppm in sulfur content was steam-reformed with the use of the same catalyst and reaction conditions as used in Inventive Example 3. Hydrogen gas stream was available satisfactorily over an initial stage of reaction. After a lapse of about 120 hours, however, the heat absorbing zone of the reactor gradually transferred toward the outlet with the temperature peak shifted downwardly, and after 50 hours unreacted hydrocarbons became detected in the outlet gas.

What is claimed is:

1. A process for the production of hydrogen which comprises contacting a feed of kerosene containing up to 1,000 wt.ppm of sulfur compounds under steam-free conditions with a nickel-containing sorbent at a pressure of below 50 kg/cm$^2$.G and a temperature of 150°-350° C. to reduce the sulfur content of said kerosene, and thereafter treating said kerosene of reduced sulfur content with a reforming catalyst in the presence of steam.

2. A process for the production of hydrogen which comprises contacting a feed of kerosene containing up to 1,000 wt.ppm of sulfur compounds under steam-free conditions with a hydrogenative desulfurization catalyst and a hydrogen sulfide absorbent in the presence of a hydrogen-containing gas at a pressure of below 50 kg/cm$^2$.G, a temperature of 270°–400° C., a LHSV of 0.2–7 h$^{-1}$ and a hydrogen-kerosene ratio of 0.02–1.0 Nm$^3$H$_2$/kg kerosene and contacting said feed with a nickel-containing sorbent at a pressure of below 50 kg/cm$^2$.G, a temperature of 150°–350° C., and a LHSV of 0.1–10h$^{-1}$ to reduce the sulfur content of said kerosene, and thereafter contacting the resulting feed of reduced sulfur content with a reforming catalyst in the presence of steam.

3. A process for the production of hydrogen suitable for use in dispersion-type fuel batteries which comprises reacting a feed of kerosene containing up to 1,000 wt.ppm of sulfur compounds under steam-free conditions with a nickel-containing sorbent comprising more than 40 wt. % of nickel deposited on a support having a surface area of larger than 50 m$^2$/g in the absence of hydrogen or in the presence of less than 0.2 mol of hydrogen at a pressure of atmospheric - 10 kg/cm$^2$.G and a temperature of 250°–300° C. thereby reducing the sulfur content in the feed to below 0.5 wt.ppm, padding a predetermined amount of water to the resulting fluid, and thereafter treating said resulting fluid with a reforming catalyst containing more than 5 wt. % of an active metal.

* * * * *